UNITED STATES PATENT OFFICE

MAX GERHARD FREISE, OF ANGERMUND NEAR DUSSELDORF, GERMANY, ASSIGNOR TO AMERICAN LURGI CORPORATION, OF NEW YORK, N. Y., A CORPORATION OF NEW YORK

PROCESS FOR RECOVERING METALS SUCH AS TIN, LEAD, ANTIMONY, OR THE LIKE

No Drawing. Application filed June 17, 1931, Serial No. 545,147, and in Germany June 23, 1930.

This invention relates to a process for recovering metals, such as tin, lead, antimony or the like.

Tin has already been recovered from oxidic stanniferous material by reduction with solid, liquid or gaseous reducing agents, without melting the residues of the charge. In this process, additions of slags or slagging agents (for example) to the stanniferous material should be particularly avoided. Nevertheless, it has been found that, on the one hand, the yield of tin obtained in this manner was uneconomically low, whilst on the other hand a good deal of tin remained, in a finely divided condition, in the unmelted residues of the charge. For this reason, attempts have already been made to employ additional means, in order to increase the yield of tin, especially when operating with gaseous reducing agents in rotary furnaces. A typical procedure consisted in increasing the pressure on the finely divided, reduced metal, either by increasing the depth of the charge, or by the addition of balls, rods or the like to the latter. Even this process, however, proved impracticable, the desired effect being unattained, or only imperfectly accomplished, since the method adopted naturally increased the compactness of the residues of the charge as well, so that, in reality, no advantage was gained in respect of the separation of the tin. Moreover, the risk was incurred of forming ferro-tin—very difficult to utilize—when heavy balls or bars of iron were used. This risk of the formation of ferro-tin is likewise not prevented in the case of another known process, in which the mixture of stanniferous material and reducing agent is rabbled on a bed of ferro-tin through which the resulting reduced tin was filtered. This process is also attended with the great defect that the reduction and separation of the tin proceed at only a very slow rate, uneconomically large furnaces being therefore required. It was probably owing to the recognition that the separation of tin is attended with considerable difficulties, when the reduction is effected without melting the residues of the charge, that another process abandons the separation of the tin during the reduction stage, and prefers to recover the finely divided reduced tin in the residues of the charge by chemical means. The chemical treatment however, involves heavy expense, so that this process is a failure, for economic reasons, especially since the recovery of tin salts, to which the chemical treatment is directed, has been superseded by other and more advantageous processes (recovery of tin salt in detinning tin plate) in the meantime.

According to the present invention, the tin is also recovered from oxidic material without melting the charge, the material being, however, treated with solid reducing agents, in a drum- or rotary-drum furnace, in such a manner as to subject the tin to a reducing and a concentrating process in succession in the same furnace.

The procedure is approximately as follows:—

The material is mixed with solid reducing agents, such as coal or coke and charged—for example, continuously—into the furnace. The first section of the furnace serves to heat up the charge, the preheated material passing then into the reduction zone. Here, a portion of the reduced tin which, since it is of course molten at the temperature of reduction, coalesces, and runs down the slope of the furnace. A further portion of the reduced tin remains, in a finely divided state, in suspension in the residues of the charge, whilst a certain, and considerable, portion of the tin escapes reduction to metal. In order to recover, in the process itself, the tin still retained in a finely divided metallic state, and in the condition of oxide, in the residues of the charge, the present invention provides, beyond the reduction zone of the rotary furnace, a concentration zone, which may occupy, for example, one quarter to two-thirds of the length of the furnace. In this zone the reduced metallic tin, which has already coalesced in the reduction zone, runs down under the charge which is partially freed from metal, at a rate substantially exceeding the travel of the charge. In consequence of the non-molten charge becoming impoverished in tin, the adhesion of the material to the furnace walls increases at the same time, so that it is lifted by the furnace walls, in following the rotary movement of the furnace to a progressively increasing degree. The lowering of the specific gravity of the charge, as the result of the partial separation of the tin, has a similar effect.

The phenomena, in the concentration zone, which favour the adhesion, to the furnace walls, of the residues of the charge which is partially freed from metal, contribute, at the same time, to diminishing the adhesion of the finely divided tin, which therefore tends, in a progressively increasing degree, to wander through the charge and towards the lowest point in the cross section of the furnace, where it meets the current of the previously separated tin and is surrounded thereby, thus enabling it to unite with the latter. The decrease of finely divided tin in the charge has the conjoint effect of bringing the material still containing tin oxide into more intimate contact with the reducing agents, so that, all the time, more tin oxide is reduced and is separated from the residues of the charge by the concentrating influence of the third zone of the rotary furnace.

At the same time, the reducing action in the concentration zone can be substantially increased, either by adding a considerable excess of solid reducing agents at the outset, so that the progressive separation of the tin causes a continual increase in the weight of reducing agent in proportion to the weight of the charge, or the same effect can be obtained by adding a further quantity of solid or liquid reducing agents in the concentration zone. Finally, the reducing action of the coal, coke or the like can be improved, in the concentration zone, by raising the working temperature, or by similar known means. Through the improved reduction in the concentration zone, such of the tin as has previously escaped reduction can also be reduced. Given suitable selection and application of these means, it is easy to render the residues of the charge substantially free from tin by the time it comes to be withdrawn from the furnace, and to tap off by far the greater portion of the tin content of the material in the form of a compact regulus, that is to say, in a molten state.

The depth of the charge is preferably kept shallow, at least in the concentration zone, for example, by passing 20–40 tons of charge through a rotary furnace, 20 metres in length, in 24 hours. It has unexpectedly been found that the separation of the tin is best effected by working with a shallow charge.

The separation of the reduced tin from the residues of the charge, and also the reduction of the metal can be further improved by increasing the effect, either of the difference in the adhesive capacity of the reduced metal to the residues of the charge and the furnace wall, or else of the difference in specific gravity between the reduced metal and the residues of the charge, or both methods, by adapting the dimensions (length, diameter, slope, nature of lining) or speed, of the furnace, or the depth of the charge, or the working temperature, or some or all of these measures, to the slagging properties of the charge under treatment. The most favourable conditions for each material, according to the principles of the invention, can be directly ascertained by a few trials.

It is not essential that the charge should contain no other reducible metal than tin. On the contrary, the present invention is also applicable, with great advantage, to originating materials which, in addition to tin, contain other similar metals such as lead, antimony, or bismuth, or also more volatile metals like zinc, cadmium, arsenic or the like. In such cases, these metals as well as the tin, will of course, be reduced in the rotary drum by the process of the present invention. The less volatile metals, such as lead, antimony and the like, behave in the process in substantially the same manner as tin. Of the more volatile metals (zinc, cadmium and the like), only a portion of the reduced metal will alloy with the tin. Another portion, the amount of which will vary with the nature of the metal and the furnace conditions for the time being, will be volatilized and pass out with the furnace gases.

According to the type of furnace and the method of operating, the volatilized metals— and even a partial volatilization of the tin, lead and the like, cannot always be prevented, except by special measures, which will be hereinafter described—may be recovered in oxide form, or partly also in the metallic state.

For example, the furnace can be fitted, at the delivery end or the charging end, with appliances for heating it with oil, pulverized coal or the like. Concurrently with the direct heating of the charge by means of burning gases external heating can be applied or various methods of electric heating.

In the case of direct heating, the burner or burners may operate with a neutral or reducing flame. In many cases, however, even a certain excess of combustion air does no harm, since, in the rotary furnace, the oxygen of the flame gases burns immediately with the solid reducing agents added to the charge, so that, even in this case, reducing conditions exist in the vicinity of the burner, not only within the charge itself, but also in the gas space above the charge. This combustion of a portion of the reducing agent with the aid of surplus air, is advantageous because it renders the reducing agent more active, that is to say, more effective for the reduction process.

The effect of the reducing atmosphere in the furnace can be increased by the addition of gaseous or liquid combustible substances, and, at the same time, these additions may replace a portion of the solid reducing agent. A powerful reducing atmosphere can, however, be created in the furnace by other means, such as by the partial combustion of the reducing agent with oxygen, or air enriched with oxygen, or by other known measures directed to suppressing the formation of carbon dioxide, and favouring that of carbon monoxide, in the furnace.

Given a furnace atmosphere that is substantially free from oxygen and carbon dioxide, any metals, such as zinc, arsenic and cadmium, associated with the charge are withdrawn from the furnace—insofar as they have been volatilized—in the metallic state, such metallic vapours being either condensed, or subjected to further treatment after oxidation.

If desired, the rotary-tube furnace may be replaced by similar furnaces, such as reciprocating furnaces which are alternately turned a definite amount in one direction and then in the other or those of the skid furnace type in which the charge is given a movement similar to that in rotary furnaces by the motion of the furnace. The furnace heads may also be closed in as airtight a manner as possible, in order to enable the composition of the gaseous atmosphere in the furnace to be under complete control and to be regulated in this manner as well.

At one point of the rotary drum, preferably near its discharge end, a sump is provided for collecting the reduced metal, when the latter is intended to be tapped off at intervals. For this purpose, the diameter of the discharge opening, for example, may be correspondingly diminished by the insertion of a ring of refractory material. One or more tap holes are provided for running-off the molten metal, through which the metal can be run into a hearth or the like. A rotary drum that is widened (for example) near the discharge end, may also be employed. Unless the reduction residues are to be melted at the end of the furnace, in the manner already described, they are removed in the manner customary in the case, for example, of volatilization processes.

Although, in many cases, it is advisable—and must be regarded as a special advantage of the process of the present invention—that no additions, other than reducing agents, need be given to the charge, special effects can, nevertheless, be produced by a well devised formation of small amounts of readily fusible slags. This slagging can be produced either by the aid of slags, or by additions of sodium carbonate, waterglass, borax and similar fluxing agents, or with a mixture of these substances. This is particularly advantageous when the charge contains little or no sterile material, or when influence is to be exerted on the adhesion of the charge to the walls of the rotary-drum furnace. The amount of these readily fusible slags can be very small, 1 to 3% of slag or about 5% of sodium carbonate being ample in many instances. The slag remains in part in the unmelted charge and modifies its adhesion to the furnace lining and the still finely distributed reduced metal, in the desired direction. Another portion of the slag, however, flows over the molten metal more rapidly towards the discharge end of the furnace, thus protecting the metal—unless the latter is already sufficiently covered by the charge—from any undesired action of the furnace gases or flue dust. For example, the unfavourable action of any sulphur in the furnace gases or charge, on the reduction process, or of any oxidizing influence of the furnace gases, can be prevented by this means, whilst, at the same time, the metal is shielded from vaporizing. Moreover, mechanical losses due to the formation of dust in the furnace—especially during the treatment of powdered or fine-grained material—can be diminished by the additions, such as sodium carbonate, especially since some additions may also be in liquid form, the charge being introduced into the furnace as a paste, prepared with sodium carbonate solution or the like. Furthermore, the yield of metal is, in general favourably influenced by any addition of sodium carbonate or the like, the amount of which must, of course, always be empirically adapted to suit the composition of the material under treatment in each case, being, for example, either greater or smaller than the quantities specified above.

As far as possible, all the additions to the charge should be free from iron, to prevent the formation of ferro-tin in the furnace.

Coke, coal, or the like may, for example, be employed as the solid reducing agent. The excess of reducing agent depends, of course, on the method of heating the furnace. If it is directly heated by oil or pulverized fuel about 35–50% of coke or lean coil is added to a charge consisting, for example, of mixed oxides, in which case a considerable excess of reducing agents favourably influences not only the reduction, but also, in a purely mechanical manner, the coalescense of the tin.

According to its content of alloying constituents, the recovered tin may, for example, be worked up into solder in the usual way, or into the pure metal by fractional liquation or electrolysis. Should volatile oxides be formed, in the process of the present invention—no matter whether they contain metals—such as tin or lead—other than zinc, or not, they may be treated for the recovery of zinc, in the metallic state, in the zinc muffle or in an electric furnace.

The process of the present invention is also applicable to originating materials which contain metals such as lead, bismuth or antimony, and are entirely or nearly free from tin since these metals act in the reduction and in the separation from the residue of the charge similarly to tin or alloys of tin. In contrast to the known processes carried on in rotary-drum furnaces, the present invention also leads, in this case, to a substantially improved yield of metal and to furnace residues low in metal. Of course, if such originating materials also contain other metals which are more readily volatile, such as zinc, cadmium or the like, these metals also will be volatilized in the form of oxide, or metallic vapour.

Although, in some instances, a certain proportion of sulphur in the charge may be accepted without objection, it is nevertheless advisable, in other instances, to keep the sulphur content of the charge as low as possible, or to roast the charge with a view to eliminating an excessive proportion of sulphur.

However, especially in the case of materials low in, or free from tin, the preliminary roasting of the charge may be avoided by bringing the material into reaction with additions which combine with or eliminate sulphur, prior to the reduction process. In such cases, therefore, a reaction zone will be provided in front of the reduction zone.

Additions which render sulphur innocuous comprise—in place of or addition to sodium carbonate or the like—oxide compounds of the alkaline-earth metals, or of the metal under treatment, and, in the case of material free from, or low in, tin, also compounds of metals of the iron group, or metallic iron and similar substances. As before, the reducing agent may consist of carbon, in any known form, though in some cases, in addition to carbon, the sulphur content of the charge—increased, if desired, by sulphur-bearing additions—can also act as reducing agent.

If, for example, a sulphide ore, containing lead and zinc (with or without gangue) is to be treated, and which may also be in the form of flotation concentrates, the additions may consist, for example, of lime or roasted pyrites. A mixture of ore, additions and solid reducing agent, such as coke breeze or lean coal, is charged into the rotary-drum furnace in the usual way. At first, the charge is heated by the hot gases traversing the furnace, and when the heating has sufficiently advanced, the sulphur reacts with the additions in such a manner that the sulphur is partly volatilized, and partly combined with the additions. At the same time, the lead ore is partly oxidized, and the lead is partly separated, in the metallic form, by the reaction with the sulphides still present in the charge. A certain volatilization of the zinc already occurs in this reaction zone, and proceeds to an increased extent after the end of the sulphur reaction i.e. after the sulphur has been driven off, or rendered innocuous by chemical combination and the material has passed from the reaction zone into the reduction zone in which the solid reducing agent acts energetically on the oxide compounds of zinc and lead formed in the reaction zone. The metal already reduced in the reaction zone runs away, out of the latter, under the residues, and through the reduction and concentration zones, to the discharge end of the furnace. In so doing it is protected by the charge, against reoxidation and, on the other hand it further assists the separation of the deposited metallic globules from the residues in the reduction and concentration zones.

The effect of the travel of the ore through the successive zones of the furnace, and the flow of metal underneath the charge, is that the separated metal is quickly removed out of the charge, and that the various chemical and mechanical operations in the recovery of metal proceed as completely as possible in the charge itself.

Instead of, or jointly with, the said additions, lead oxides, or also zinciferous lead oxides, may be employed as additions, because they too enter into reaction with the charge, with the result that the sulphur content in the latter is rendered harmless without disturbing the working of the furnace.

In special cases, such as a high content of lead sulphide in a charge that is free from, or low in, tin, the sulphide sulphur in the charge may, in certain circumstances, also form a sufficient reducing agent, through the reaction of lead sulphide with the lead oxide or lead sulphate formed in the course of the process. A necessary condition in such case is that the furnace atmosphere does not exert a too powerful oxidizing action, and that the correct temperatures are maintained. Special additions of sulphur, intended to act in the same manner may, of course, also be added to the charge in known form.

It is not essential that the additions and reducing agent should be introduced into the furnace conjointly with the material. On the contrary, the zonal method—to which the invention is directed—of operating the rotary tube, can be additionally facilitated by introducing (e. g. blowing) the reducing agent—such as coke breeze or coke dust—into the furnace in such a manner that it mainly comes into action only during, or towards the end of, the sulphur reaction, that is to say, in the reduction zone. The additions also may be similarly introduced into the furnace, separately from the material under treatment, so that, for example, the material is heated in the furnace itself before being mixed with the addition. The heating may also be accompanied by a partial oxidation of the material. However, the reactions by which the addition combines with, or expels, the sulphur, may also be initiated by subjecting the material, prior to admission into the furnace, to a partial roasting performed in such a manner as to establish the correct ratio of metallic oxide to metallic sulphide required in each case. Of course, the material pretreated in this manner may also receive other additions.

The converse procedure, however, is also practicable, that is to say, oxide material may be treated instead of sulphide material, in which event the requisite sulphur is provided by adding sulphur-bearing materials—such as sulphides of the metal to be recovered, or other suitable sulphides—to the charge.

In the zonal method of introducing the material, additions and reducing agent, into the furnace, it is often advisable to locate the heating apparatus at the charging point, since, in these circumstances, the material is quickly heated and the commencement of the reaction is correspondingly accelerated. Moreover, the heating can be conducted in such a manner that the freshly introduced material comes into contact with furnace gases which still contain certain amounts of oxygen, with the result that exothermic reactions are set up between the oxygen and the various constituents of the charge and, in addition to economizing fuel, have a favourable influence on the other reactions in the charge.

The furnace lining may consist, for example, of the usual refractory blocks, which will have a long working life because the furnace temperatures need not be excessively high. The only other corrosion of the lining will be such as may be caused by charge constituents capable of forming readily fusible slags with the lining material. This possibility of destruction and the arbitrary formation of slag may, however, also be prevented by constructing the furnace lining of the same material as that which is to be treated, for example, of moulded blocks of tin oxide and binding media, or of the reducing agent, such as coal briquettes.

Zonal lining may, however, be adopted with advantage, on the basis of constructing the lining in each zone of materials which mainly react in such zone.

Thus the reaction zone may be lined with the reagent, such as dolomite, and the reduction zone with the reducing agent, such as coal briquettes. The lining for the concentration zone may, for example, also consist of coal briquettes, or of blocks of the material that is to be reduced, or of known refractory materials. If the residues are to be melted as well as the metal, the melting zone at the discharge end of the furnace may be constructed of the material that is to be reduced, or of some other inert structural material.

If the charge contains zinc, a small portion of this may pass, in the form of solid solution, into the molten metal. This tendency may be deliberately utilized for the purpose of refining the molten metal, especially tin or tin alloy. By interposing a process of liquation subsequent to the treatment in the rotary-drum furnace according to the present invention, the zinc content of the metal assures the elimination of even the final traces of these injurious impurities—with which even the noble metals must be classed in this case—even when higher final temperatures are employed in the process of the present invention, and the bulk of the said impurities consequently issue from the furnace, in a molten state, along with the metal. The remainder of the zinc can then be separated from the metal, by poling or the like.

The property of zinc of forming refractory alloys with noble metals, copper, nickel, arsenic and the like can, moreover, be utilized to advantage in refining tin and tin alloys recovered in processes other than that according to the present invention. In such case it is advantageous to allow the zinc to act on the metal to be refined, under conditions which reduce zinc oxide—i. e. in the nascent state—since, by this means, the zinc can be more effectually distributed in the metal, from the outset, and the metal that is to be removed can be more effectively separated.

The remaining quantities can be eliminated by liquation, by cooling the reduced molten metal with the still retained zinc. In many cases the known two-stage method of separation is advisable, in which, for example, the bulk of the impurities is removed in the first stage, and the final traces in the second stage. The second stage is then performed at temperatures approximating to the melting point of the tin or tin alloy, which can be done without objection, since only small quantities of dross are formed, so that, in spite of the low working temperature, the amount of metallic tin still contained in the dross is small.

In the claims the term "metals" is intended to include alloys and mixtures of metals when more than one reducible metal is present in the charge.

Having now particularly described and ascertained the nature of my said invention and in what manner the same is to be performed, I declare that what I claim is:—

1. A process for obtaining metals from materials containing reducible compounds of at least one of the metals tin, lead, bismuth and antimony which comprises passing a mixture of the materials and a solid carbonaceous fuel substantially continuously through a longitudinally extending furnace while subjecting the mixture to continuous agitation by the movement of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, and thereafter removing the metal and the residue from the furnace.

2. A process for obtaining metals from material containing reducible compounds of at least one of the metals tin, lead, bismuth and antimony which comprises passing a mixture of the materials with a small amount of a substance capable of forming an easily liquefiable slag and a solid carbonaceous fuel substantially continuously through a longitudinally extending furnace while subjecting the mixture to continuous agitation by the movement of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, and thereafter removing the metal and the residue from the furnace.

3. A process as set forth in claim 2 in which an alkali metal compound is added to the charge to form the readily fusible slag.

4. A process as set forth in claim 2 in which soda is added to the charge to form the readily fusible slag.

5. A process for obtaining metals from materials containing reducible compounds of at least one of the metals tin, lead, bismuth and antimony which comprises passing a mixture of the materials with a small amount of a substance capable of forming an easily liquefiable slag and a solid carbonaceous fuel substantially continuously through a longitudinally extending furnace while subjecting the mixture to continuous agitation by the rotation of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, and thereafter removing the metal and the residue from the furnace.

6. A process for obtaining metals from materials containing reducible compounds of at least one of the metals tin, lead, bismuth and antimony which comprises passing a mixture of the materials with a small amount of a substance capable of forming an easily liquefiable slag and a substantial excess of a solid carbonaceous fuel substantially continuously through a longitudinally extending furnace while subjecting the mixture to continuous agitation by the movement of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, and thereafter removing the metal and the residue from the furnace.

7. A process for obtaining metals from materials containing reducible compounds of at least one of the metals tin, lead, bismuth and antimony which comprises passing a mixture of the materials with a small amount of a substance capable of forming an easily liquefiable slag and a solid carbonaceous fuel substantially continuously through a longitudinally extending furnace while subjecting the mixture to continuous agitation by the movement of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, and thereafter melting the residue and separately removing the metal and the molten residue from the furnace.

8. A process for obtaining metals from materials containing reducible compounds of at least one of the metals tin, lead, bismuth and antimony which comprises passing a mixture of the materials with soda and a solid carbonaceous fuel substantially continuously through a longitudinally extending furnace while subjecting the mixture to continuous agitation by the rotation of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, thereafter melting the residue and separately removing the metal and the residue from the furnace.

9. A process for obtaining metals from materials containing reducible compounds of at least one of the metals tin, lead, bismuth and antimony which comprises preheating a mixture of the materials with a small amount of a substance capable of forming an easily liquefiable slag and a solid carbonaceous fuel and passing the preheated mixture substantially continuously through a longitudinally extending furnace while subjecting the mixture to continuous agitation by the movement of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the residue, and thereafter removing the metal and the residue from the furnace.

10. A process for obtaining metals from materials containing reducible compounds of at least one of the metals tin, lead, bismuth and antimony which comprises roasting the materials and passing a mixture of the roasted materials with soda and a solid carbonaceous fuel substantially continuously through a longitudinally extending furnace while subjecting the mixture to continuous agitation by the rotation of the furnace, heating the charge by means of combustion gases so that in the zone adjacent the charging end of the furnace the metals are reduced without melting the residue of the charge, and thereafter continuing the heating and agitation of the material in the next adjacent portion of the furnace until the particles of reduced metal separate from the unmolten residue, and thereafter removing the metal and the residue from the furnace.

11. A process for obtaining metals from materials containing reducible compounds of at least one of the metals tin, lead, bismuth and antimony, together with at least one of the more volatilizable metals zinc, cadmium and arsenic, which comprises passing a mixture of the materials and a solid carbonaceous fuel substantially continuously through a longitudinally extending furnace while subjecting the mixture to continuous agitation by the movement of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, and thereafter removing the metal and the residue from the furnace.

12. A process for obtaining metals from materials containing reducible compounds of at least one of the metals tin, lead, bismuth and antimony, together with at least one of the more volatilizable metals zinc, cadmium, and arsenic, which comprises passing a mixture of the materials and a solid carbonaceous fuel substantially continuously through a longitudinally extending furnace while subjecting the mixture to continuous agitation by the movement of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the unmolten residue, thereafter removing the metal and the residue from the furnace and removing at least a portion of said volatilizable metals from the furnace in the furnace gases.

13. A process for obtaining metals from materials containing reducible compounds of at least one of the metals tin, lead, bismuth and antimony, together with at least one of the more volatilizable metals zinc, cadmium and arsenic, which comprises passing a mixture of the materials with soda and a solid carbonaceous fuel substantially continuously through a longitudinally extending furnace while subjecting the mixture to continuous agitation by the rotation of the furnace, heating the charge by means of combustion gases so that in the zone adjacent the charging end of the furnace the metals are reduced without melting the residue of the charge thereafter continuing the heating and agitation of the material in the next adjacent portion of the furnace until the particles of reduced metal separate from the residue, and thereafter removing the metal and the residue from the furnace.

14. A process for obtaining metals from materials containing reducible compounds of at least one of the metals tin, lead, bismuth and antimony, together with at least one of the more volatilizable metals zinc, cadmium and arsenic, which comprises passing a mixture of the materials with soda and a solid carbonaceous fuel substantially continuously in a thin layer through a longitudinally extending furnace while subjecting the mixture to continuous agitation by the rotation of the furnace, heating the charge by means of combustion gases so that in the zone adjacent the charging end of the furnace the metals are reduced without melting the residue of the charge, thereafter continuing the heating and agitation of the material in the next adjacent portion of the furnace until the particles of reduced metal separate from the residue, and thereafter removing the metal and the residue from the furnace.

15. A process for obtaining metals from materials containing sulphur compounds of at least one of the metals tin, lead, antimony and bismuth which comprises passing a mixture of the materials with a sulphur-eliminating reagent substantially continuously through a longitudinally extending furnace while subjecting the mixture to continuous agitation by the movement of the furnace, heating the charge by means of combustion gases in a zone adjacent the charging end of the furnace until the reaction between the sulphur compounds and the sulphur-eliminating reagent is substantially completed, thereafter continuing the agitation of the material in admixture with a solid carbonaceous fuel in the next adjacent portion of the furnace while heating the charge to a temperature such that the metals are reduced without melting the residue of the charge, thereafter continuing the heating and agitation of the material in the next succeeding portion of the furnace until the particles of reduced metal separate from the unmolten residue, and thereafter removing the metal and the residue from the furnace.

16. A process for obtaining metals from materials containing sulphur compounds of at least one of the metals tin, lead, antimony and bismuth, together with at least one of the more volatilizable metals zinc, cadmium and arsenic, which comprises passing a mixture of the materials with a sulphur-eliminating reagent substantially continuously through a longitudinally extending furnace while subjecting the mixture to continuous agitation by the movement of the furnace, heating the charge by means of combustion gases in a zone adjacent the charging end of the furnace until the reaction between the sulphur compounds and the sulphur-eliminating reagent is substantially completed, thereafter continuing the agitation of the material in admixture with a solid carbonaceous fuel in the next adjacent portion of the furnace while heating the charge to a temperature such that the metals are reduced without melting the residue of the charge, thereafter continuing the heating and agitation of the material in the next succeeding portion of the furnace until the particles of reduced metal separate from the residue, and thereafter removing the metal and the residue from the furnace.

17. A process for obtaining metals from materials containing sulphur compounds of at least one of the metals tin, lead, antimony and bismuth which comprises passing a mixture of the materials with a sulphur-eliminating reagent substantially continuously through a longitudinally extending rotary furnace while subjecting the mixture to continuous agitation by the rotation of the furnace, heating the charge by means of combustion gases in a zone adjacent the charging end of the furnace until the reaction between the sulphur compounds and the sulphur-eliminating reagent is substantially completed, thereafter continuing the agitation of the material in admixture with a solid carbonaceous fuel in the next adjacent portion of the furnace while heating the charge to a temperature such that the metals are reduced without melting the residue of the charge, thereafter continuing the heating and agitation of the material in the next succeeding portion of the furnace until the particles of reduced metal separate from the unmolten residue, and melting the residue and thereafter separately removing the metal and the residue from the furnace.

18. A process for obtaining metals from materials containing sulphur compounds of at least one of the metals tin, lead, antimony and bismuth, together with at least one of the more volatilizable metals zinc, cadmium and arsenic, which comprises passing a mixture of the materials with a sulphur-eliminating reagent substantially continuously through a longitudinally extending furnace while subjecting the mixture to continuous agitation by the rotation of the furnace, heating the charge by means of combustion gases in a zone adjacent the charging end of the furnace until the reaction between the sulphur compounds and the sulphur-eliminating reagent is substantially completed, thereafter adding a solid carbonaceous fuel and continuing the agitation of the material in the next adjacent portion of the furnace while heating the charge to a temperature such that the metals are reduced without melting the non-metallic portion of the charge, thereafter continuing the heating and agitation of the material in the next succeeding portion of the furnace whereby the particles of reduced metal separate from the unmolten residue and melting the residue and thereafter separately removing the metal and the residue from the furnace.

19. A process as set forth in claim 15 wherein the charge is heated by means of combustion gases passed into the furnace at the charging end thereof.

In testimony whereof, I affix my signature.

MAX GERHARD FREISE.